Figure 1:
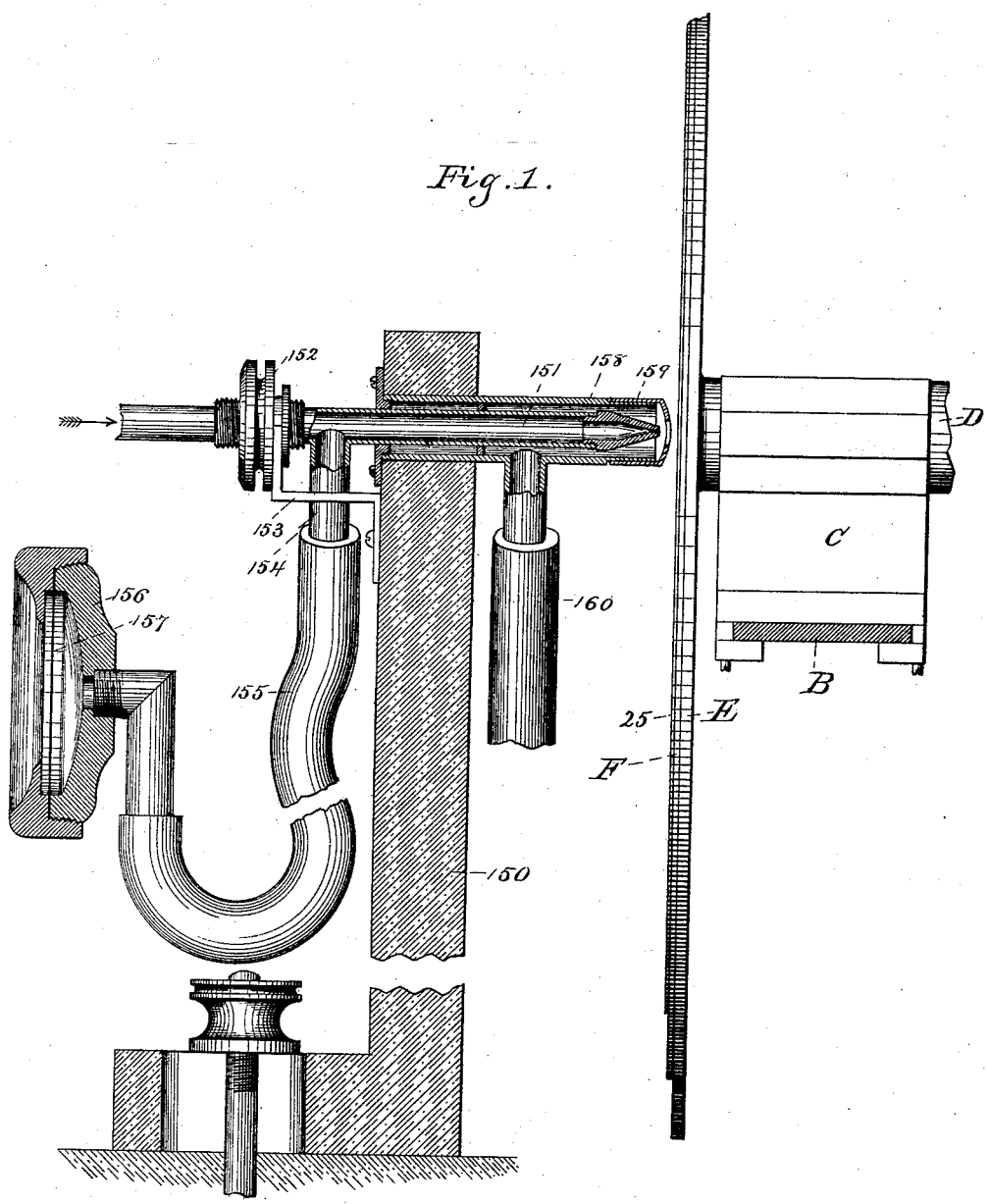

(No Model.) 3 Sheets—Sheet 1.

A. G. & C. A. BELL & S. TAINTER.
REPRODUCING SOUNDS FROM PHONOGRAPH RECORDS.

No. 341,212. Patented May 4, 1886.

Witnesses.
Wm Kuttus Jr
Philip Mauro

Inventors
Alexander Graham Bell
Chichester A. Bell and
Sumner Tainter by
A. Pollok their atty.

N. PETERS, Photo-Lithographer, Washington, D. C.

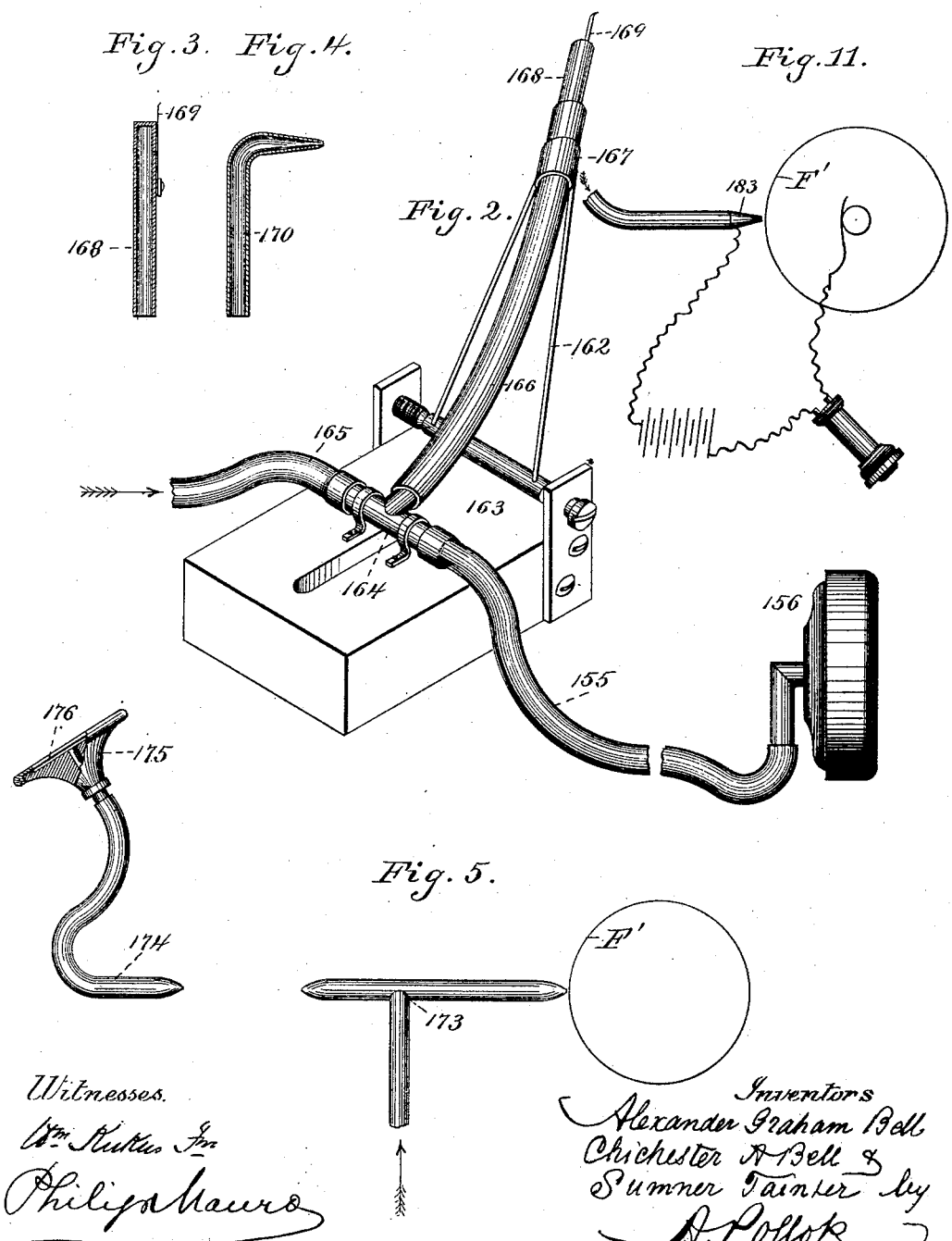

(No Model.) 3 Sheets—Sheet 3.
A. G. & C. A. BELL & S. TAINTER.
REPRODUCING SOUNDS FROM PHONOGRAPH RECORDS.
No. 341,212. Patented May 4, 1886.
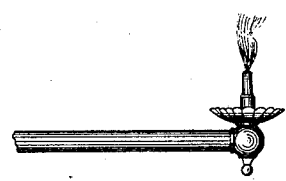
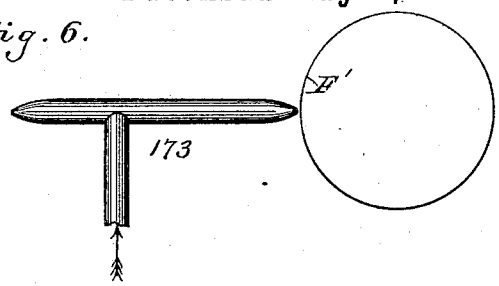
*Fig. 6.*
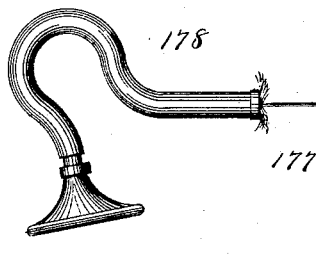
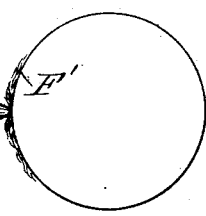
*Fig. 7.*
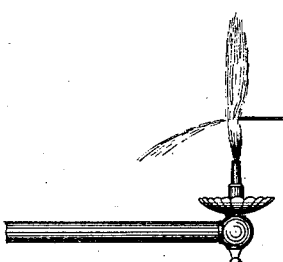
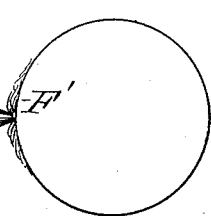
*Fig. 8.*
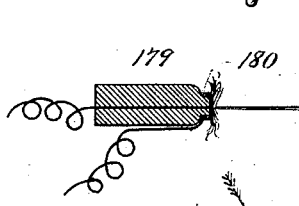
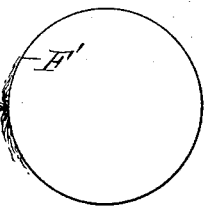
*Fig. 9.*
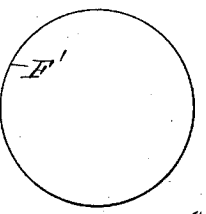
*Fig. 10.*
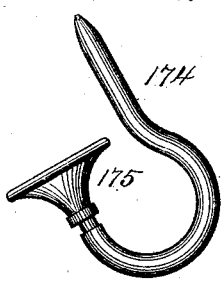
Witnesses.
Wm. Kukus Jr.
Philip Mauro
Inventors
Alexander Graham Bell
Chichester A. Bell &
Sumner Tainter by
A. Pollok
their attorney.

UNITED STATES PATENT OFFICE.

ALEXANDER GRAHAM BELL, CHICHESTER A. BELL, AND SUMNER TAINTER, OF WASHINGTON, DISTRICT OF COLUMBIA.

REPRODUCING SOUNDS FROM PHONOGRAPH RECORDS.

SPECIFICATION forming part of Letters Patent No. 341,212, dated May 4, 1886.

Application filed November 18, 1885. Serial No. 183,237. (No model.)

*To all whom it may concern:*

Be it known that we, ALEXANDER GRAHAM BELL, CHICHESTER A. BELL, and SUMNER TAINTER, all residents of Washington, in the District of Columbia, have invented a new and useful Improvement in Reproducing Sounds from Phonograph Records, which improvement is fully set forth in the following specification.

This invention relates to producing in air or other suitable medium vibrations corresponding in form to sound-waves by means of a record, which has been formed in, on, or by a suitable solid body, the inequalities, variations, or irregularities of which represent the sound to be reproduced. It is preferred to use records cut in wax and afterward subjected to an incipient fusion, as described in the application for Letters Patent of Chichester A. Bell and Sumner Tainter, filed June 27, 1885, and officially numbered 170,044; but any suitable record may be employed, such as Edison's well-known record or phonogram in indented metal foil.

The invention is independent of any particular mode of preparing the record; and it consists in certain new means (methods and apparatus) for producing sounds or sonorous vibrations from a sound or speech record.

According to the present invention the record is caused to act upon a fluid (gas or liquid) in which it induces the sonorous vibrations or changes similar to such vibrations. The solid body or style which rubs over the record, or is otherwise directly vibrated by it, and which has heretofore always been employed, is or may be dispensed with. The vibrations are communicated to the air or other suitable fluid by direct contact of the same with the record. One advantage of the arrangement is that wear on the record is or may be thus reduced, if not practically avoided. It may also be observed that this method not only admits of reproduction from a very minute record, but also enables sounds of considerable loudness to be obtained. The fluid may remain as a body in contact with the record, or it may be forced against the same as a jet.

In the first case it may be supposed that the minute elevations or other inequalities by striking successively against the air or other surrounding medium throw it into vibrations, which can be received by instrumentalities placed in proximity to the record, or they carry with them by adhesion a film of air, which by contact with a stationary device causes sonorous vibrations. Practically a tube terminating in a small orifice is supported with the orifice in close proximity to or in contact with the record, and the sonorous vibrations are impressed upon the air in said tube. These vibrations may be received in the ear, and thus be made evident directly as sound, or they may be made to impress similar vibrations upon other media, through which, after one or more translations, the sounds or the sonorous vibrations may be made evident.

In the second case a jet of air or other fluid is directed upon the moving record, and as the elevations and depressions or other inequalities of the record come in contact with the jet they produce variations therein similar to sound vibrations, which vibrations can be listened to or made evident as sound in various ways. For example, the jet may be included in an electric circuit, and the variations in the electrical condition of the same caused by the inequalities in the record may be made evident by ordinary telephonic instruments. It is preferred, however, to make use of the mechanical vibrations which the record impresses upon the jet-fluid. For this purpose the vibrations may be received from the fluid after it has come in contact with the record, or they may be received from the fluid behind the jet-orifice, or they may be received in both ways. In order to receive the vibrations from the fluid behind the jet-orifice the variations in the record are made to obstruct said orifice more or less, so that the fluid at the orifice is by the energy of motion subjected to strains or pressures corresponding in degree to the amount of obstruction. These successive strains produce in the fluid, or in the bodies in contact therewith, vibrations similar to and capable of being made evident as sound-waves. So far as we are aware, this property possessed by currents of ponderable fluid of generating pressure when their flow is checked at an outlet, and which is utilized for lifting water in the hydraulic ram, has never been applied to the translation of sonorous vibrations from one medium to another. This feature of the invention, therefore, is not limited to the case in which a fluid acts upon a sound-record to reproduce sounds therefrom, as are for the most part the other improvements which make up the present invention. The fluid may, indeed, act upon the record so that the latter forms a variable obstruction to the flow, and this method of obstructing the orifice or outlet is specially claimed; but the flow can also be otherwise obstructed—as, for example, by means of a valve connected with and operated by the ordinary rubbing style—and still be within the invention. Apparatus for practically carrying out the foregoing methods has been devised, and forms part of the invention.

In the accompanying drawings, which form a part of this specification, Figure 1 is a vertical section, partly in elevation, of a sound-reproducer constructed in accordance with the invention, the record or tablet being also represented; Fig. 2, a perspective view of another form of reproducer, also constructed in accordance with the invention; Figs. 3 and 4, sections of two forms of reproducer-head which may be used with the apparatus shown in Fig. 2; and Figs. 5 to 11 are diagrams illustrating different modes of receiving the vibrations impressed upon the fluid by the record.

Referring to Fig. 1, the record is cut as a spiral in the wax coating 25 of tablet F, which is supported on the face of a metal disk, E, mounted upon an arbor, D, the latter being journaled in bearings in the slide C, movable on a frame, B, as in the application before referred to. The arbor D is revolved and the slide C moved on the frame, so that each point on the spiral record moves in its turn in front of the reproducer. This instrument is supported on an adjustable standard, 150. The tube 151, which at the end next the record is provided with a conical cap, is adjustably supported on the standard, so that the orifice can be brought nearer to or set farther from the record. The adjustment is made by the nut 152, which engages a screw-thread on the tube, and is held from endwise motion by the arm 153, fastened to the standard and entering a groove on the nut. Air under a constant initial pressure of, say, one to one and one-half pounds (1 to $1\frac{1}{2}$ pounds) to the square inch is admitted to the tube, so that the jet plays against the record. A much lower pressure can be used with good effect—that of one-half ($\frac{1}{2}$) an inch of water, or less, for example; but there is a gain in loudness by the use of higher pressures. A jet orifice of about one-thirtieth ($\frac{1}{30}$) of an inch in diameter, (supposing the elevations and depressions of the record to have about the same width, so that the jet will play on one line only at the same time,) set at a distance of about one-fiftieth ($\frac{1}{50}$) of an inch, or less, from the record will answer. Under these conditions the jet-orifice will be obstructed more or less by the record, and the outflow of air being thereby varied variations in pressure will be produced at the jet-orifice, which variations can be made evident as sound-waves. The air outside the jet-orifice will also be thrown into vibrations which can be received by suitable means. In this figure the tube 151 is provided with a branch, 154, which is connected by the sound-conveying tube 155 with the ear-piece 156. A diaphragm, 157, of thin metal or rubber, divides the interior of the ear-piece, and prevents the air in the tube 151 from escaping. The vibrations of the confined air are communicated to the outside air through the diaphragm 157. The diaphragm may be placed at any point between the ear and the jet-tube. By placing the ear-piece 156 to the ear the sounds recorded on the tablet F can be heard. To receive the vibrations in the air, after it has come in contact with the record, the pressure on the air should, for the orifice named, be one-half ($\frac{1}{2}$) an inch, or less, of water, but with smaller orifices the pressure may be much greater. The receiving-tube 158, which, as shown, surrounds the tube 151, has the perforated adjustable cap 159 set in close proximity to the record—say, at a distance of one-fiftieth ($\frac{1}{50}$) of an inch, or less—the perforation being about one-quarter ($\frac{1}{4}$) of an inch in diameter. As shown, the cap is nearer the record than the jet-orifice. The best relative position can easily be ascertained in any case by tentative adjustments. It is found that the air (and most other fluids as well) has a tendency to cling or adhere to the record, so that the jet, after it strikes the latter, spreads out in a film. The end of the receiving-tube should be within that film, as close as convenient to the point where the jet strikes the record; but the sounds may also be heard by placing it close to the record anywhere in the vicinity of the jet orifice. The receiving-tube is or may be connected by the sound conveying-tube 160 with a suitable ear-piece. With the low pressure specified the tube 151 can be drawn back for a considerable distance without materially affecting the loudness or accuracy of the reception of sounds by the tube 160. The record, however, before the maximum distance is obtained, ceases to obstruct the flow from the orifice to any practical extent, and very little sound, or none at all, is heard at the ear-piece 156. On the other hand, the tube 151 can be adjusted so close to the record that the reception at the ear-piece 156 is much better than by the sound-conveyer 160. The apparatus shown is also capable of use without any pressure upon the air in tube 151. If the jet-orifice be adjusted to within about one-hundredth ($\frac{1}{100}$) of an inch of the record, the recorded sounds can be heard, although faintly, at the ear-piece. If no air is blown through the tube 151 the diaphragm to the ear-piece will be unnecessary, although it may be used.

In Fig. 2 the reproducer-standard 162, instead of being rigid, is hinged to the base 163. This base 163 is adjustably clamped by a set-nut, as shown for the standard 150 in Fig. 1. The coupling 164, secured on the base, is connected with the tube 165 for introducing the compressed air, also with the tube 166 (of flexible material, such as soft vulcanized rubber) for conveying the compressed air to the outlet, which is controlled by the record, and with the sound-conveying tube 155, leading to the ear-piece 156. The tube 166 passes through the ring 167 at the top of the standard, and has a jet-tube (preferably of glass or hard rubber) slipped into it. The flexibility of the tube 166 furnishes a universal joint to the jet-tube. As shown in Figs. 2 and 3, the jet-orifice is on the side of the jet-tube 168, and it is covered by a flexible style, 169, the point of which rubs over the record. The record thus controls the outlet of the compressed air through the style, which acts as a valve. The vibrations of the style cause it to obstruct (more or less) the outlet at the jet-orifice, and consequently the energy of the confined air is partly expended in vibrations, as described with reference to Fig. 1.

The jet-tube 168 can be replaced by the jet-tube 170. (Shown in Fig. 4.) The orifice is in the end of this tube, which in use rests against and rubs over the record. The latter thus acts, as in Fig. 1, as a vibratory valve to control the outflow at said orifice.

Instead of directly transmitting to the ear the vibrations generated in the fluid whose flow is obstructed, these vibrations can be impressed upon a sensitive jet, and the vibrations of this jet received in any suitable way.

An elaborate description of sensitive jets and of the modes of producing and vibrating them and of receiving their vibrations is given in the applications of Chichester A. Bell, filed May 1, 1884, and officially numbered 129,947, 129,948, and 129,949, and it is unnecessary to repeat it here, especially as they have only a collateral interest. It will suffice to show by a few examples how they may be used in the reproduction of sounds from records in accordance with the present invention.

In diagram Fig. 5 the air under a pressure of, say, three-tenths of an inch of water enters the tube 173 and forms two jets, one of which blows against the record P', (shown as a cylinder,) while the other is directed upon the orifice of a receiving-tube, 174, connected with the ear-piece 175, which is provided with a diaphragm, 176, to prevent the air from blowing into the ear of the user. The orifice for the jet which plays upon the record may be about four one-hundreths of an inch in diameter. That for the sensitive jet may also be four one-hundreths of an inch in diameter, and the orifice of the receiving-tube may be about the same.

In operation the record obstructs the flow from the adjacent orifice, and the variable pressure thereby produced throws into vibration the sensitive jet, which plays upon the receiving-tube. The reproduced sounds are heard by listening at the ear-piece 175.

In Fig. 6 the parts and operation are the same, except that the sensitive air-jet plays against a flame from a pin-hole burner, and produces sounds in the surrounding atmosphere.

In Fig. 7 a liquid (water) is used. It enters the tube 173 under a head of, say, four feet, and the sensitive jet plays upon a small rubber membrane, 177, stretched over the end of the sound-conveying tube 178.

In Fig. 8 the sensitive jet of liquid plays against a lighted gas-jet from a pin-hole burner a little to one side of the axis of the flame.

In Fig. 9 the liquid (which must be a conductor of electricity and is preferably water acidified with one part by volume of sulphuric acid of 66° Baumé, free from lead, to three hundred of water) plays against the end of a platinum wire, 179, embedded in a block of hard rubber, and spreading out in a thin film makes contact with a platinum ring, 180, surrounding the end of the block. The wire and the ring form the terminals of a galvanic circuit in which a telephone is to be placed in order to receive the sound.

In Fig. 10 the tube 181 has its end in close proximity to the record. The air in the tube being thrown into vibrations by the record impresses similar vibrations upon a sensitive air-jet issuing from the tube 182 and playing upon the receiving-tube 174.

In Fig. 11 a jet of conducting-liquid issuing from a metal tube, 183, plays upon the record F', which is of conducting material. The metal tube 183 and the record form the terminals of a telephonic circuit in which a galvanic battery is included.

In the foregoing description it will be understood that when distances, dimensions, forms, materials, and the like are specified with particularity it is by way of example, in order to enable others the more easily to carry out the invention, and not as limitations of the invention, since it is evident that these as well as other details can be varied within considerable limits, and yet the same or substantially similar results be produced by the same or substantially similar means. It is evident also that parts of the invention can be used separately.

Having now fully described our said invention and the manner of carrying the same into effect, what we claim is—

1. In the reproduction of sounds from records, the improvement consisting in causing the record to impress upon a fluid by direct contact therewith vibrations or vibrational changes similar in form to sound-waves, substantially as described.

2. The combination, with a sound-record, of means for subjecting a fluid to the action of said record, so as to be vibrated directly thereby—such, for example, as a receiving-tube having its end arranged relatively to the record, as explained, and containing a fluid which makes contact with said record—substantially as described.

3. In the reproduction of sounds from records, the improvement consisting in directing a jet of fluid against the moving record and thereby causing the latter to impress upon said fluid vibrations or vibrational changes similar in form to sound-waves, substantially as described.

4. In the reproduction of sounds from records, the improvement consisting in directing a jet of fluid upon the moving record, and thereby inducing vibrations in said fluid and receiving the said vibrations from said fluid after it has been acted upon by the record, substantially as described.

5. The combination, with a sound-record, of a jet-tube arranged opposite said record for directing a jet of fluid against the same, substantially as described.

6. The combination, with a sound-record, of a jet-tube for directing a jet of fluid against the record, and receiving devices—such, for example, as a sound-conveying tube having its receiving end in proximity to the record—for taking up or collecting the vibrations from said fluid after it has been acted upon by the record, substantially as described.

7. In the production or translation from one medium to another of sonorous vibrations, the method of utilizing the moving energy of fluids by producing a current in a tube or confined space, checking the said current at the outlet in accordance with the forms of sound-waves of the successive sounds to be translated or reproduced, and receiving the vibrations from the fluid behind said outlet, substantially as described.

8. The combination, with a tube conveying fluid under pressure, of appliances in the nature of a vibratory valve at the outlet for checking the flow in accordance with the varying forms of a succession of sound-waves, and receiving devices for taking up or responding to the sonorous vibrations produced in said fluid behind the said outlet in consequence of the checking of the current, substantially as described.

9. In the reproduction of sounds from records, the improvement consisting in producing a current of fluid in a tube or confined space, causing the record to produce a varying obstruction to the current at the outlet, and receiving from the fluid behind the orifice the sonorous vibrations impressed thereon by the checking of the current, substantially as described.

10. The combination, with the sound-record, of a tube conveying fluid under pressure, appliances in the nature of a vibratory valve at the outlet for checking the flow in accordance with the sound-record, and receiving devices for taking up or responding to the sonorous vibrations produced in the fluid behind the said outlet by the checking of the current, substantially as described.

11. In the reproduction of sounds from records, the improvement consisting in producing a current of fluid in a tube or confined space, directing a jet supplied from said current upon the record, and causing the inequalities in the record to act as a varying obstruction to said jet-orifice, so that the current behind the said orifice will be checked more or less and sonorous vibration thus be propagated backward from the jet-orifice, substantially as described.

12. The combination, with a sound-record, of a jet having the jet-orifice in close proximity to said record, so that the latter acts as a vibratory valve to check the flow from said orifice, substantially as described.

13. In the reproduction of sounds from records, the improvement consisting in directing a jet of fluid upon the record, causing said record to obstruct the flow through the orifice, as well as to impress vibrations upon the fluid which makes contact with the record, and receiving the sonorous vibrations both behind and outside of the jet-orifice, substantially as described.

14. The combination, with a sound-record and a jet-tube having its orifice in proximity to the record, so that the latter acts the part of a vibratory valve in checking the flow from said orifice, of receiving devices for taking up or responding to the sonorous vibrations in the fluid behind the jet-orifice, and a second set of receiving devices for taking up or responding to the sonorous vibrations induced by the record in the fluid outside of the jet-orifice, substantially as described.

15. A reproducing apparatus comprising a tube for directing a jet of fluid upon the sound-record, and the means, as described, for supporting the same and regulating its position, in combination with the sound-record and receiving devices for taking up or responding to the sonorous vibrations induced in the fluid by the record, substantially as described.

In testimony whereof we have signed this specification in presence of two subscribing witnesses.

ALEXANDER GRAHAM BELL.
CHICHESTER A. BELL.
SUMNER TAINTER.

Witnesses:
PHILIP MAURO,
C. J. HEDRICK.